(12) United States Patent
Maruya

(10) Patent No.: US 7,227,569 B2
(45) Date of Patent: Jun. 5, 2007

(54) SURVEILLANCE SYSTEM AND A SURVEILLANCE CAMERA

(75) Inventor: Kensuke Maruya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 812 days.

(21) Appl. No.: 10/430,492

(22) Filed: May 6, 2003

(65) Prior Publication Data

US 2005/0057653 A1 Mar. 17, 2005

(30) Foreign Application Priority Data

May 7, 2002 (JP) .......................... P. 2002-131308

(51) Int. Cl.
H04N 7/18 (2006.01)
G06K 9/46 (2006.01)
(52) U.S. Cl. ...................................... 348/143; 382/190
(58) Field of Classification Search ................ 348/143, 348/151, 155, 161, 169; 382/107, 156, 190; 340/506
See application file for complete search history.

(56) References Cited

U.S. PATENT DOCUMENTS 5,497,430 A * 3/1996 Sadovnik et al. ........... 382/156
5,886,738 A * 3/1999 Hollenbeck et al. ........ 348/151
6,501,377 B2 * 12/2002 Ebata et al. ................. 340/506
6,792,144 B1 * 9/2004 Yan et al. .................... 382/190
2002/0071596 A1 * 6/2002 Estevez ....................... 382/107

FOREIGN PATENT DOCUMENTS

JP 6-325180 11/1994
JP 2000-163600 6/2000

* cited by examiner

Primary Examiner—Gims Philippe
(74) Attorney, Agent, or Firm—Pearne & Gordon LLP

(57) ABSTRACT

The surveillance system is a system that a plurality of surveillance camera units cooperatively acquire image of a movable object. Each of the surveillance camera units is equipped with a image recognition function. A surveillance camera unit that has recognized the feature information on the movable object in the image picked up transmits the image to a monitor unit via a network and the feature information on the movable object to the other surveillance camera unit via the network. A surveillance camera unit that has recognized the feature information received from the other camera unit in the image picked up transmits the image to the monitor unit via the network as well as transmits the feature information on the movable object to the other surveillance camera unit via the network. This makes it possible to keep tracking of a target even in a space including more blind spots.

17 Claims, 13 Drawing Sheets

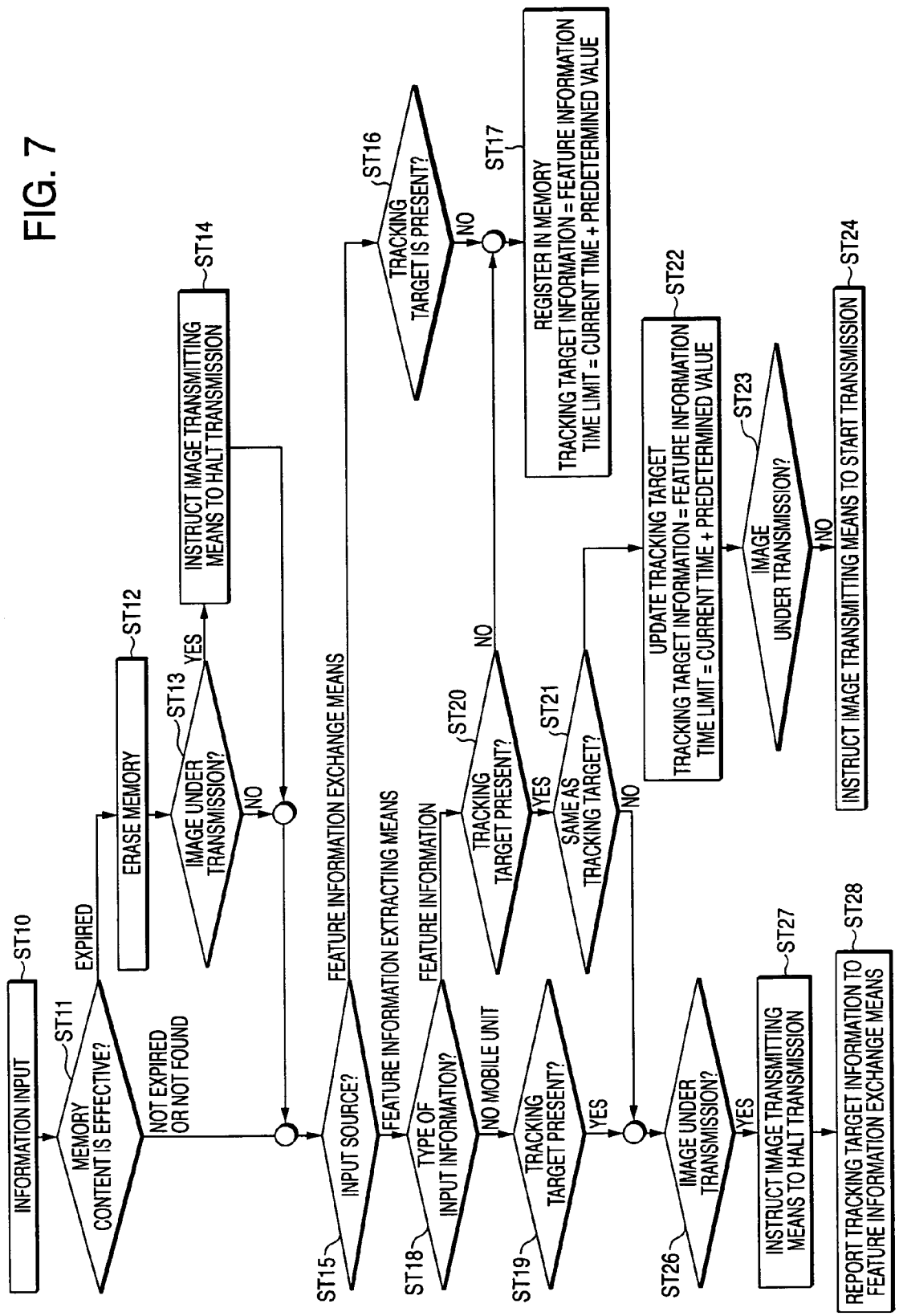

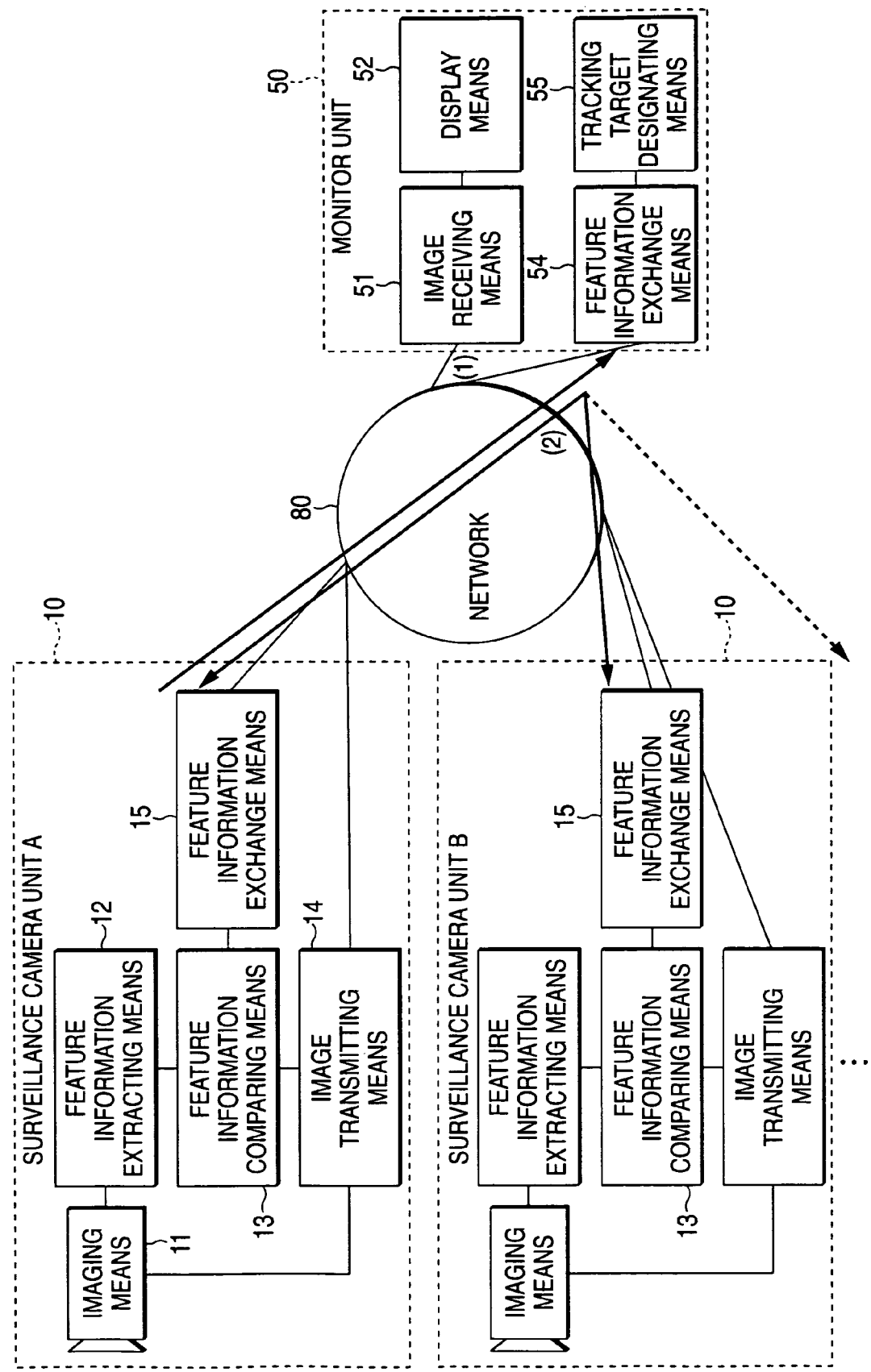

FEATURE INFORMATION ON OBJECT DESIGNATED TO EACH CAMERA IS BROADCASTED

SURVEILLANCE SYSTEM AND A SURVEILLANCE CAMERA

BACKGROUND OF THE INVENTION

1. Field of the Invention

The present invention relates to a surveillance system equipped with a plurality of surveillance cameras and a surveillance camera used in the system, particularly, to a surveillance system that performs surveillance of moving persons by way of combination of a plurality of cameras and a camera used in the system.

2. Description of the Related Art

A variety of systems that performs automated surveillance of persons who enters or exits a building have been developed.

"JP P2000-163600A1" discloses a surveillance system that extracts the characteristics of the face of a person from the image picked up by a surveillance camera and compares the characteristics with facemasks registered in a database. In this system, control means for analyzing an image signal from a surveillance camera recognizes the position of the face of a person shot by the surveillance camera and controls the panning, tilting and zooming operations of the surveillance camera to track the motion of the face. The control means then extracts the contour lines of the eyes, nose, mouth and eyebrows, extracts the feature points of the face based on the contour lines, and compares with facemasks registered in the database.

"JP PH06-325180A1" discloses a system for tracking and monitoring a movable object by using a plurality of cameras. As shown in FIG. 13, this system has a plurality of surveillance camera units 1, a monitor unit 6 for displaying images from the surveillance camera units 1, and a camera switching unit 2 for switching between the surveillance camera units 1 to change the image output to the monitor unit 6. In the camera switching unit 2, motion recognizing means 4 detects the motion of a movable object from the image of the movable object displayed on the monitor unit 6, and camera switching means 3 performs switching of the surveillance camera unit 1 so as to reference camera setup information 5 to output on the monitor unit 6 a image from the surveillance camera units 1 set up at the destination of the movable object.

In case of that movement of a suspicious person is tracked and monitored indoors or outdoors, a single surveillance camera that is capable of controlling panning, tilting and zooming operations only can track within a limited range. Even when a plurality of cameras are used, a system that detects the motion of a movable object to determine a target camera, information about position and motion of the movable object is lost when a blind spot is present, thus preventing further tracking.

Therefore, in an environment where cameras can be seamlessly set up, such as in a wide place or complicated place, tracking of a movable object is impossible. When a camera has gone faulty, a blind spot also appears, which prevents tracking.

This system must set the alignment of surveillance cameras to determine the target camera. Therefore, it is not easy to move or add surveillance cameras.

SUMMARY OF THE INVENTION

The object of the invention is to provide a surveillance system that a plurality of cameras can cooperatively track and monitor a movable object and the camera.

The invention provides a surveillance system in which a plurality of surveillance camera units cooperatively acquire images of a movable object, has a plurality of the surveillance camera units each having imaging means for picking up images, feature information extracting means for analyzing the images picked up by the imaging means to extract feature information representing features of the movable object, and image transmitting means for transmitting images picked up by the imaging means to a communications unit via a network, wherein the surveillance camera unit which has recognized the feature information on the movable object in the images picked up transmits the images to the communications unit connected via the network, when the surveillance camera unit no longer recognizes the feature information on the movable object, the surveillance camera unit transmits the feature information on the movable object as a tracking target to the other surveillance camera unit, and the other surveillance camera unit which has recognized the feature information on the movable object in the images picked up transmits the images to the communications unit connected via the network.

The invention provides a surveillance camera apparatus for acquiring images of a movable object to be tracked, has imaging means for picking up images and outputting digital image data, feature information extracting means for analyzing the digital image data by using image recognition techniques to extract feature information representing features of the movable object, feature information comparing means for comparing the feature information extracted by the feature information extracting means with a feature information on the movable object to be tracked to determine whether both pieces of feature information are identical or not, feature information exchange means for exchanging the feature information on the movable object to be tracked with the other surveillance camera apparatus via a network, and image transmitting means for transmitting images picked up by the imaging means to communications unit via the network when the feature information comparing means has determined that both pieces of feature information are identical.

According to the above-described surveillance system, a plurality of surveillance cameras communicate the feature information on a tracking target with each other, and each surveillance camera uses the feature information to track the target. This makes it possible to keep tracking of a target even in a space including more blind spots.

BRIEF DESCRIPTION OF THE DRAWINGS

FIG. 7 is a flowchart showing the operation of feature information comparing means according to the first embodiment;

FIG. 9 is a block diagram showing a configuration of a surveillance system according to the second embodiment of the invention;

DETAILED DESCRIPTION OF THE PREFERRED EMBODIMENTS (First Embodiment)

A surveillance camera unit of a surveillance system of the first embodiment has a function to recognize a movable object (person) and a function to exchange information on a recognized person between the surveillance camera units.

Figure 1:
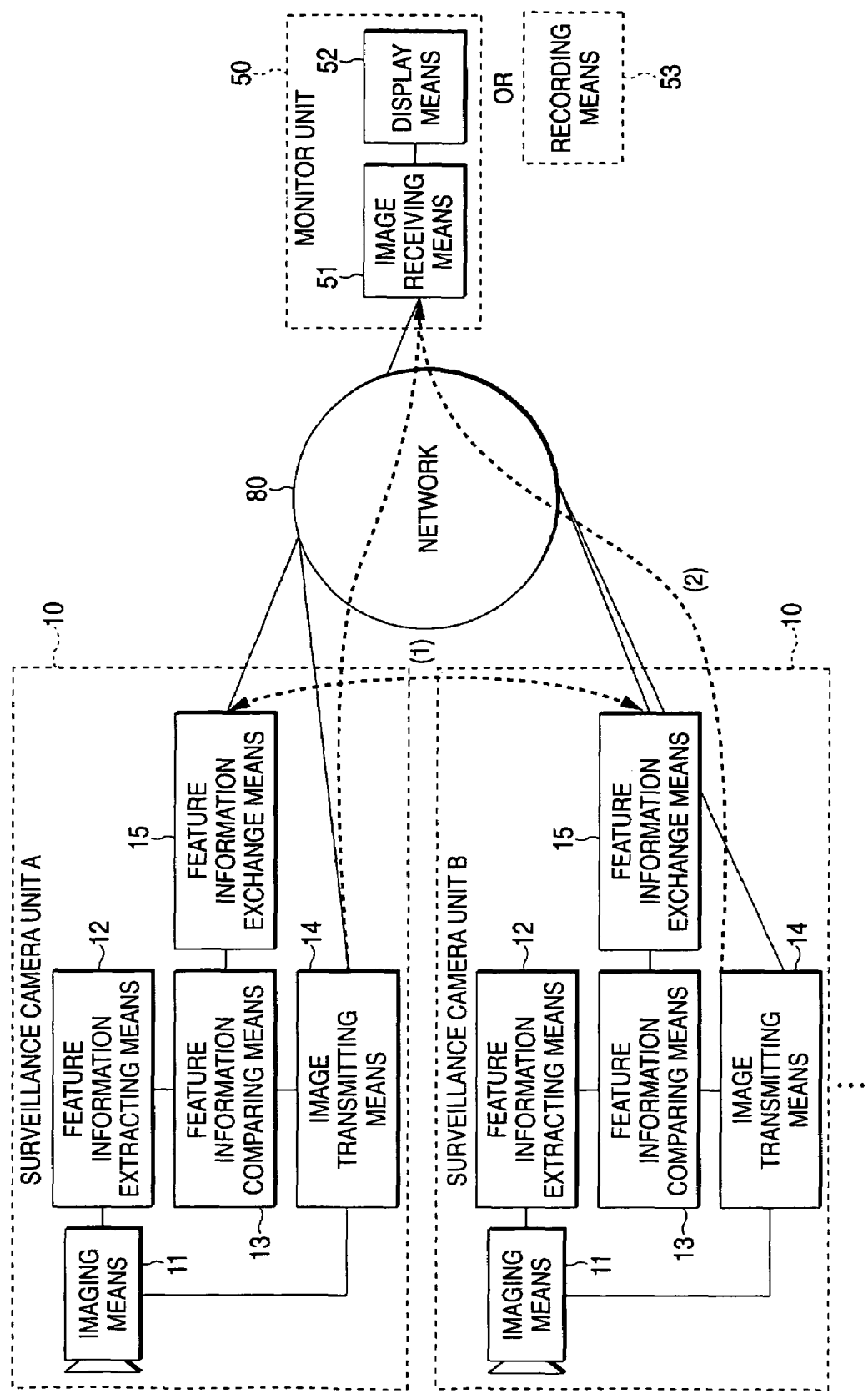
FIG. 1 is a block diagram showing a configuration of a surveillance system in according to the first embodiment of the invention.

As shown in FIG. 1, the surveillance system has a plurality of surveillance camera units 10 and a monitor unit 50 for displaying images of a person under tracking transmitted from the surveillance camera units 10. Necessary data is transmitted via a network 80 between the surveillance camera units 10 and between the surveillance camera units 10 and the monitor unit 50.

The surveillance camera units 10 (surveillance camera unit A and surveillance camera unit B, for example) each has imaging means 11 for picking up images and outputting digital image data, feature information extracting means 12 for extracting feature information on the image picked up by the imaging means 11, feature information comparing means 13 for comparing the feature information extracted by the feature information extracting means 12 with the feature information on the person under tracking, image transmitting means 14 for transmitting images containing the feature information on the person under tracking to a monitor unit 50 via a network 80, and feature information exchange means 15 for exchanging the feature information on the person under tracking with the other surveillance camera unit 10 via the network 80.

The monitor unit 50 has image receiving means 51 for receiving image signal transmitted from the surveillance camera 10 and display means 52 for displaying the image. The monitor unit 50 may have recording means 53 for recording the image signal in place of or in addition to the display means 52.

Feature information extracted by the feature information extracting means 12 of the surveillance camera 10 is, for example, image data of a movable object captured from the image. Otherwise, the feature information is information to identify a movable object by shape, color size and so on, or the information to identify shape and position of eyes, nose and mouth of face.

Figure 2:
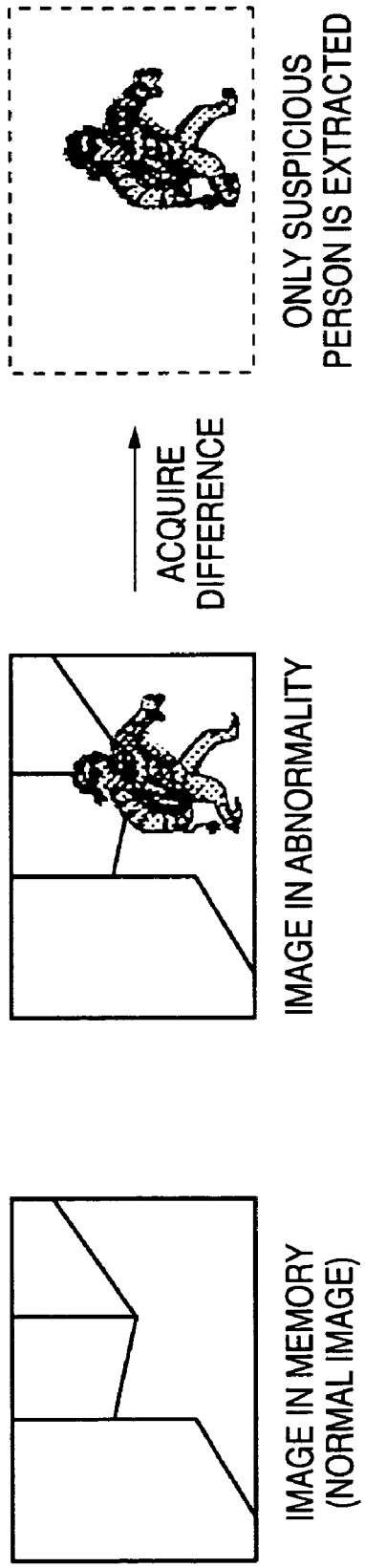
FIGS. 2A, 2B and 2C explain a image recognition method through cutout of an object by a surveillance camera unit according to the first embodiment.

A method of extracting the feature information is well known. FIGS. 2A, 2B and 2C schematically show a method of cutting out image data of a movable object from an image. As shown in FIGS. 2A, 2B and 2C, a regular image (FIG. 2A) is stored into a frame memory, difference from a image containing a movable object (FIG. 2B) is acquired, then the object where the difference is present is extracted to extract the movable object alone (FIG. 2C)

Figure 3:
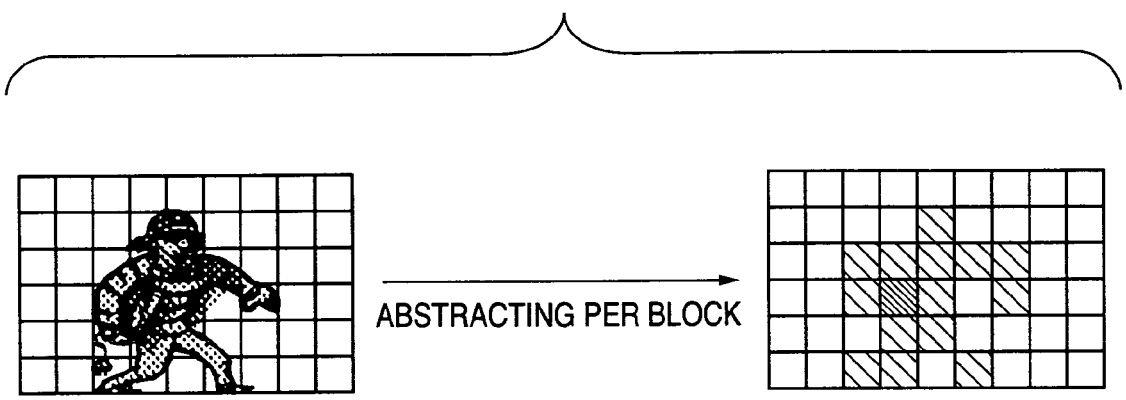
FIG. 3 shows a image recognition method of abstracting the object information on a surveillance camera unit according to the first embodiment.

FIG. 3 schematically shows a method of generating information such as shape, color size and etc. of the movable object from the extracted image of the movable object. As shown in FIG. 3, the screen is divided into blocks and the representative color of each bock is extracted to abstract the information on the movable object.

Figure 4:
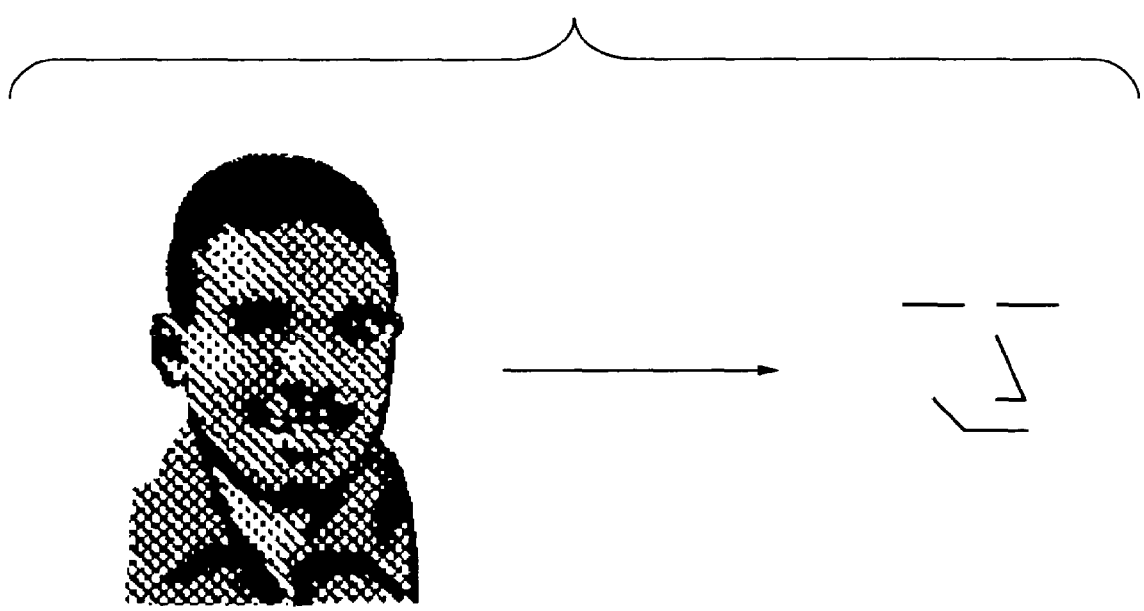
FIG. 4 shows a image recognition method of extracting the feature information on the human face from a surveillance camera unit according to the first embodiment.

FIG. 4 schematically shows a method of generating feature information of a human face. This method extracts information on shape and position of each components of the human face to acquire information on size, position and shape of eyes, mouth nose and so on. This method is detailed in the aforementioned JP P2000-163600A1 and JP 2001-256496.

Operation of the surveillance system will be described. The imaging means 11 of the surveillance camera unit 10 converts image data to digital data in predetermined intervals and inputs the resulting data to the feature information extracting means 12.

Figure 5:
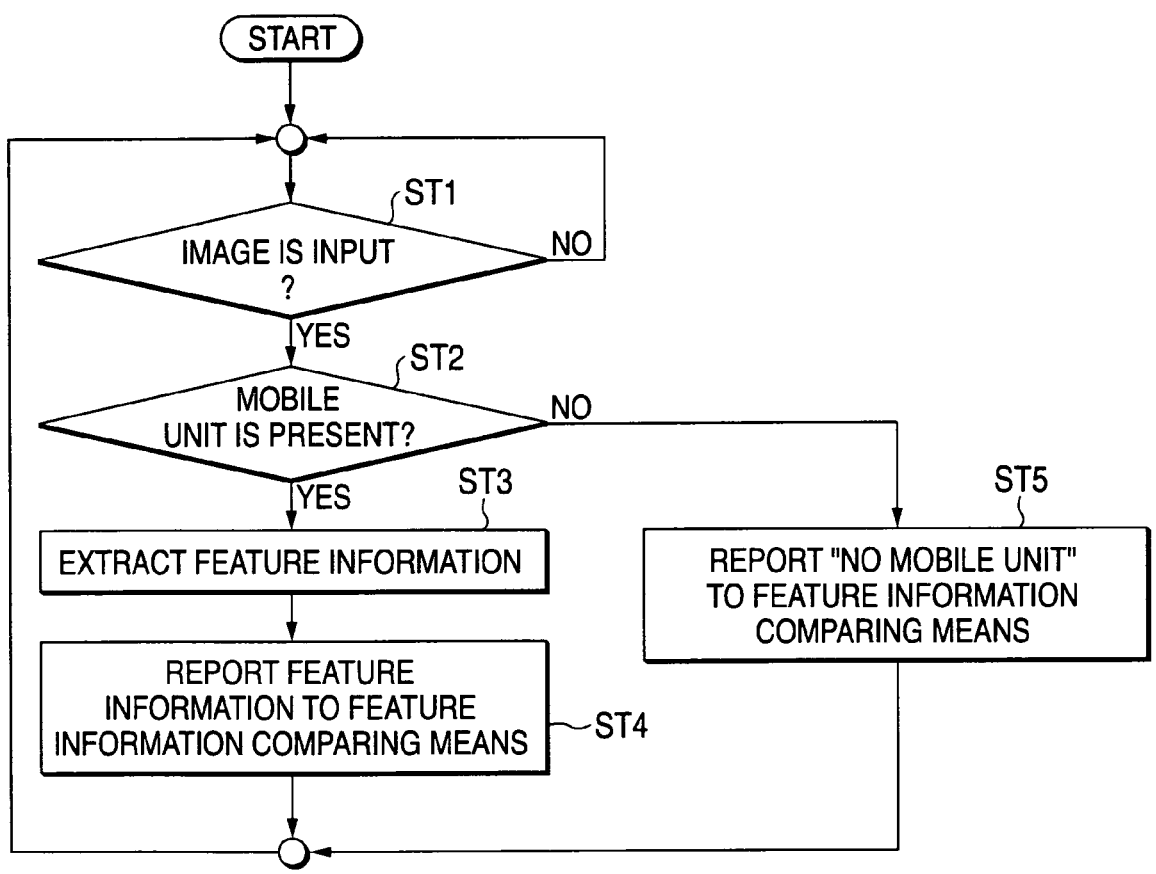
FIG. 5 is a flowchart showing the operation of feature information extracting means according to the first embodiment.

The flowchart of FIG. 5 shows the process steps of the feature information extracting means 12.

Step 1: When image data is input from the imaging means 11,

Step 2: the feature information extracting means 12 determines whether a movable object is contained in the image, and in the case that a movable object is contained, Step 3: The feature information extracting means 12 extracts feature information and Step 4: outputs the feature information to the feature information comparing means 13.

Step 5: In the case that a movable object is not contained in the image, the feature information extracting means 12 reports "No movable object" to the feature information comparing means 13.

Figure 6:
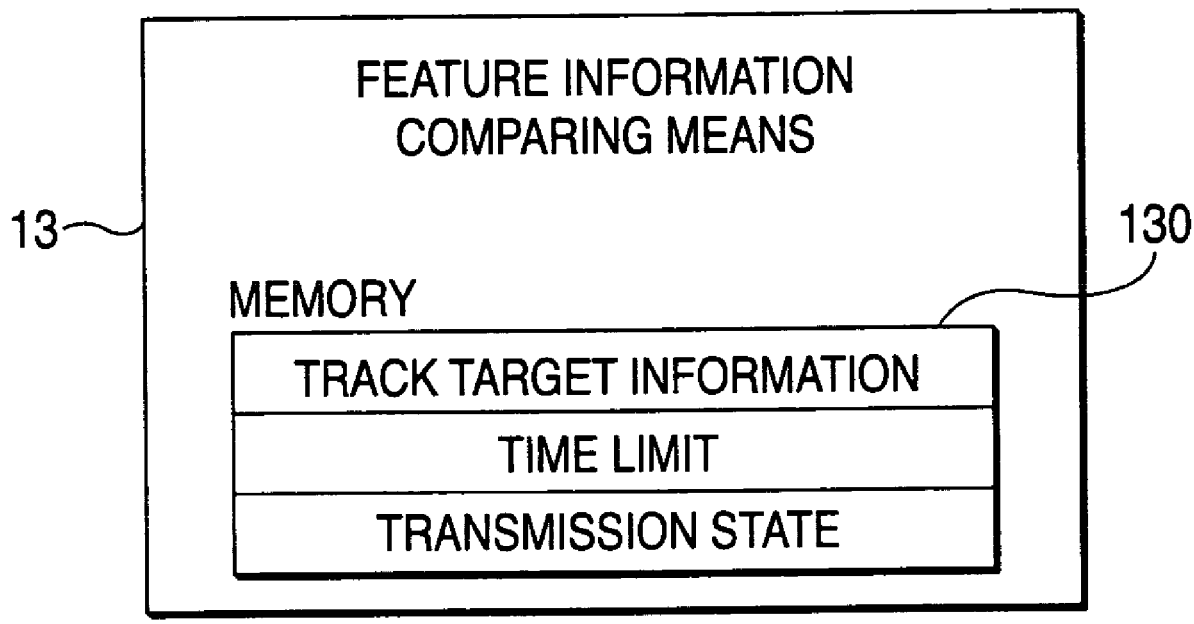
FIG. 6 shows the memory configuration of feature information comparing means according to the first embodiment.

As shown in FIG. 6, the feature information comparing means 13 retains information on a memory 130 including the tracking target information as feature information on the tracking target, the time limit of tracking and the transmission state (whether image is under transmission) of the image transmitting means 14.

To the feature information comparing means 13 is input feature information or "No movable object" information from the feature information extracting means 12. The feature information on the movable object received from the other surveillance camera unit 10 is input to the feature information exchange means 15. The feature information received from the other surveillance camera unit 10 is registered into the memory 130 as tracking target information. In the case that feature information is input from the feature information extracting means 12 when no tracking target information is registered in the memory 130, this feature information is registered as tracking target information.

The flowchart of FIG. 7 shows the process steps of the feature information comparing means 13.

Step 10: When information is input from the imaging means 11,

Step 11: the feature information comparing means 13 determines whether the time limit of the memory 130 is expired or not. In the case that the time limit is expired, Step 12: the feature information comparing means 13 erases all data in the memory 130.

Step 13: In the case that the image transmitting means 14 is transmitting images, Step 14: the feature information comparing means 13 instructs the halt of image transmission.

Step 15: In the case that the time limit of the memory 130 is not expired or no data is recorded in the memory 130 (including a case where memory is erased in step 12), the feature information comparing means 13 determines the input source of the information input in step 10. When the information is input from the feature information exchange means 15, Step 16: in the case the a tracking target of the surveillance camera unit 10 is not present, Step 17: the feature information comparing means 13 registers feature information into the memory 130 as the tracking target information and sets the time limit to "the current time+a predetermined value".

When the information input source is the feature information extracting means 12 in step 15, Step 18: the feature information comparing means 13 determines the type of the input information. When the input information is feature information, Step 20: in the case a tracking target of the surveillance camera unit 10 is not present, Step 17: the feature information comparing means 13 registers feature information into the memory 130 as the tracking target information and sets the time limit to "the current time+a predetermined value".

When a tracking target is present (tracking target information is present in the memory 130) in step 20, Step 21: the feature information comparing means 13 compares the input feature information with the feature information on the tracking target to determine whether both pieces of information are identical or not.

A method of comparing images to determine whether they are identical is well known. In a simple method, in the case that the feature information is image data of a movable object or the other abstract data, the following steps are used:

1. Correct size and orientation of the image data by scaling and rotation.
2. Calculate the difference of both pieces of image data.
3. In the case that the calculation result is within a predetermined range, determine that both pieces of data are identical.

The other feature information can be converted to information represented in multi-dimensional values. Thus, use of the weighted root-sum of the difference value of the components of each dimension can determine the identity of data.

That is, the identity of the feature information (x1, y1, z1) and feature information (x2, y2, z3) is determined to be identical, in the case of $$a1*(x1-x2)^2+a2*(y1-y2)^2+a3*(z1-z2)^2$$

is smaller than a certain value. (where a1, a2, a3 are determined in accordance with type of the feature information)

A more precise method is described for example in the following literature:

Takeshi Agui and Tomoharu Nagao, "Process and recognition of image", SHOKODO Co.

Chapter 6 "feature space and clustering"

Chapter 7 "pattern matching"

When the input feature information and the feature information on the tracking target are determined identical in step 21, Step 22: the feature information comparing means 13 updates the tracking target information to the input feature information and updates the time limit to "the current time+a predetermined value".

Step 23: Unless the image transmitting means 14 is not transmitting images,

Step 24: the feature information comparing means 13 instructs the image transmitting means 14 to start transmission of images picked up by the imaging means 11.

When the input information is "No movable object" in step 18,

Step 19: the feature information comparing means 13 determines whether the surveillance camera unit 10 has captured the tracking target. When the surveillance camera unit 10 has captured the tracking target (that is, when the movable object to be tracked in the image from the surveillance camera unit 10 has disappeared), Step 26: in the case that the image transmitting means 14 is transmitting images, Step 27: the feature information comparing means 13 instructs the image transmitting means 14 to halt transmission of images and Step 28: reports the tracking target information registered in the memory 130 to the feature information exchange means 15.

When the input feature information differs from the feature information on the tracking target in step 21 also, it is assumed that the movable object to be tracked has disappeared from the screen, so that the steps 26 through 28 are followed.

The feature information exchange means 15 transmits the feature information reported from the feature information comparing means 13 to the feature information exchange means 15 of the other surveillance camera unit 10.

In this way, when the surveillance camera unit A has lost sight of the tracking target, the feature information exchange means 15 transmits the feature information extracted by the feature information extracting means 12 to the other surveillance camera unit 10. The other surveillance camera unit B compares, on the feature information comparing means 13, the feature information received from the feature information exchange means 15 with the feature information extracted by the feature information extracting means 12, and starts transmission of the image when identity is found. The feature information exchange means 15 passes the feature information to identify the tracking target thereby making it possible to track the same target by using a plurality of surveillance camera units.

Figure 8A:
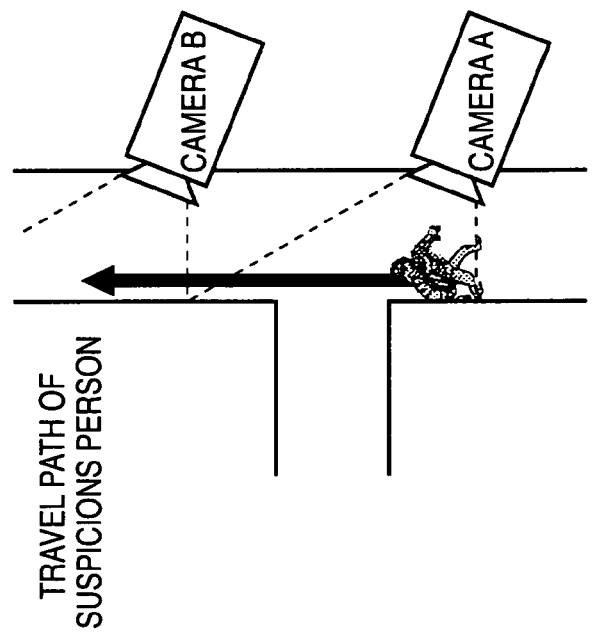
FIGS. 8A and 8B explain the monitor display of a surveillance system according to the first embodiment of the invention.
Figure 8B:
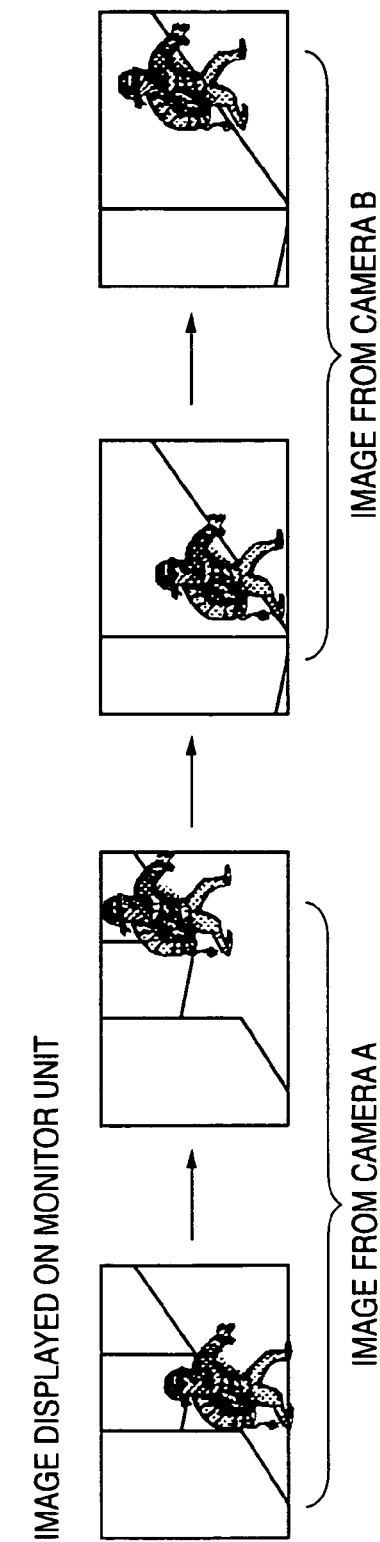

FIGS. 8A and 8B schematically shows image which appears on the display screen of a monitor unit 50 (FIG. 8B) when a suspicious person has moved in the direction of an arrow while the surveillance camera unit A and the surveillance camera unit B are setup in a building (FIG. 8A). When the suspicious person disappears from the image on the surveillance camera unit A, the surveillance camera unit B that has received the feature information on the suspicious person from the surveillance camera unit A captures the suspicious person and transmits his/her image to the monitor unit 50.

In this way, according to the surveillance system, it is possible to track the same target while a plurality of surveillance camera units are exchanging information even in a space including more blind spots.

(Second Embodiment)

The second embodiment is a surveillance system where a monitor unit can designate a tracking target.

The monitor unit 50 of the system has, as shown in FIG. 9, feature information exchange means 54 for exchanging feature information with the surveillance camera unit 10 and tracking target designating means 55 used by a surveyor to designate a tracking target. The remaining configuration is the same as that of the first embodiment (FIG. 1).

Operation of the surveillance system will be described referring to FIGS. 10A–10D.

Figure 10A:
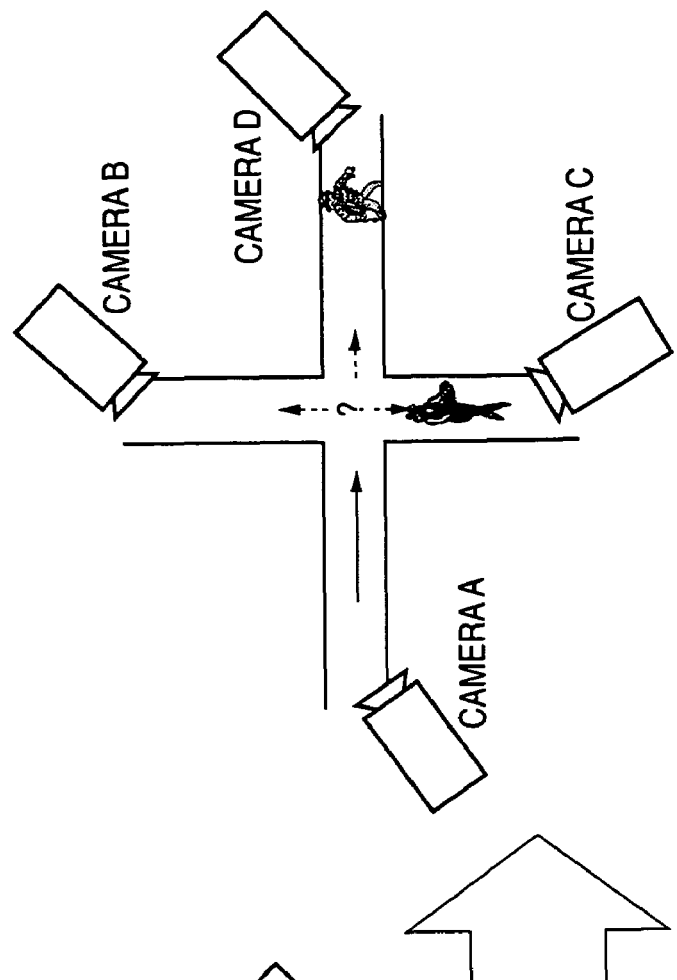
FIGS. 10A–10D explain the monitor display of a surveillance system according to the second embodiment of the invention.

A surveillance camera unit A in FIG. 10A which has extracted the feature information on a movable object transmits the image picked up by the imaging means 11 (FIG. 10B) to the monitor unit 50 from a image transmitting means 14. The image is received by the image receiving means 51 of the monitor unit 50, and the display means 52 displays the image.

A surveyor of the monitor unit 50, who has found a suspicious person from the image on the display, designates the tracking-target suspicious person with use of the tracking target designating means 55. The feature information exchange means 54 of the monitor unit 50 communicates with the feature information exchange means 15 of the surveillance camera unit A which has transmitted this image and acquires the feature information on the tracking target designated by the tracking target designating means 55 (procedure (1) in FIG. 9).

The feature information exchange means 54 of the monitor unit 50 then broadcasts the feature information on the tracking target acquired from the surveillance camera unit A to respective surveillance camera units A, B, C, D (procedure (2) in FIG. 9). The feature information exchange means 54 of each surveillance camera unit A, B, C, D receives the feature information and outputs the feature information to the feature information comparing means 13. The feature information is registered as tracking target information into the memory 130 of the feature information comparing means 13.

The subsequent operation is the same as that of the first embodiment. The surveillance camera unit A that captures a tracking target on the screen keeps transmitting the image to the monitor unit 50 while updating the time limit of the tracking target information until the tracking target goes out of the shooting range. Once the tracking target goes out of the shooting range, the surveillance camera unit A transmits the feature information the tracking target to the other surveillance camera units B, C, D and halts transmission of the image to the monitor unit 50.

The surveillance camera units B, C, D retain the feature information transmitted from the monitor unit 50 in the memory 130 until the time limit is expired. Capturing a tracking target on the screen in the meantime, the surveillance camera units B, C, D transmit its image to the monitor unit 50. Once the time limit of the feature information transmitted from the monitor unit 50 is expired, the surveillance camera units B, C, D retain the feature information transmitted from the monitor unit 50 in the memory 130, same as the first embodiment.

Figure 10C:
Figure 10B:
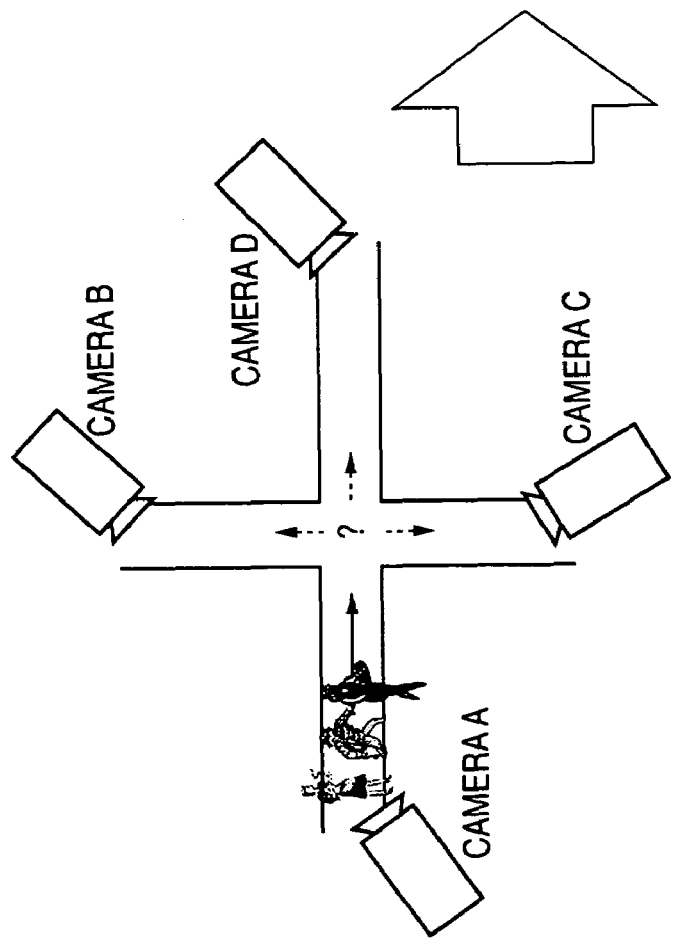
Figure 10D:
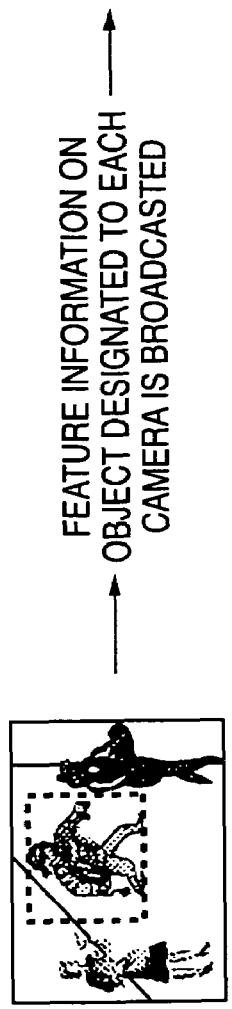

In FIG. 10C, the surveillance camera units B, C, D respectively detect a movable object, while only the surveillance camera unit D which has detected a suspicious person matching the feature information transmits the image (FIG. 10D) to the monitor unit 50.

In this way, according to this surveillance system, a surveyor can designate a tracking target, and each surveillance camera unit automatically tracks the tracking target in accordance with this designation. Therefore, it is possible to explicitly designate a tracking target in a busy location, thereby allowing effective tracking and surveillance.

(Third Embodiment)

The third embodiment is a surveillance system where a suspicious person other than those who are registered is tracked.

Figure 11:
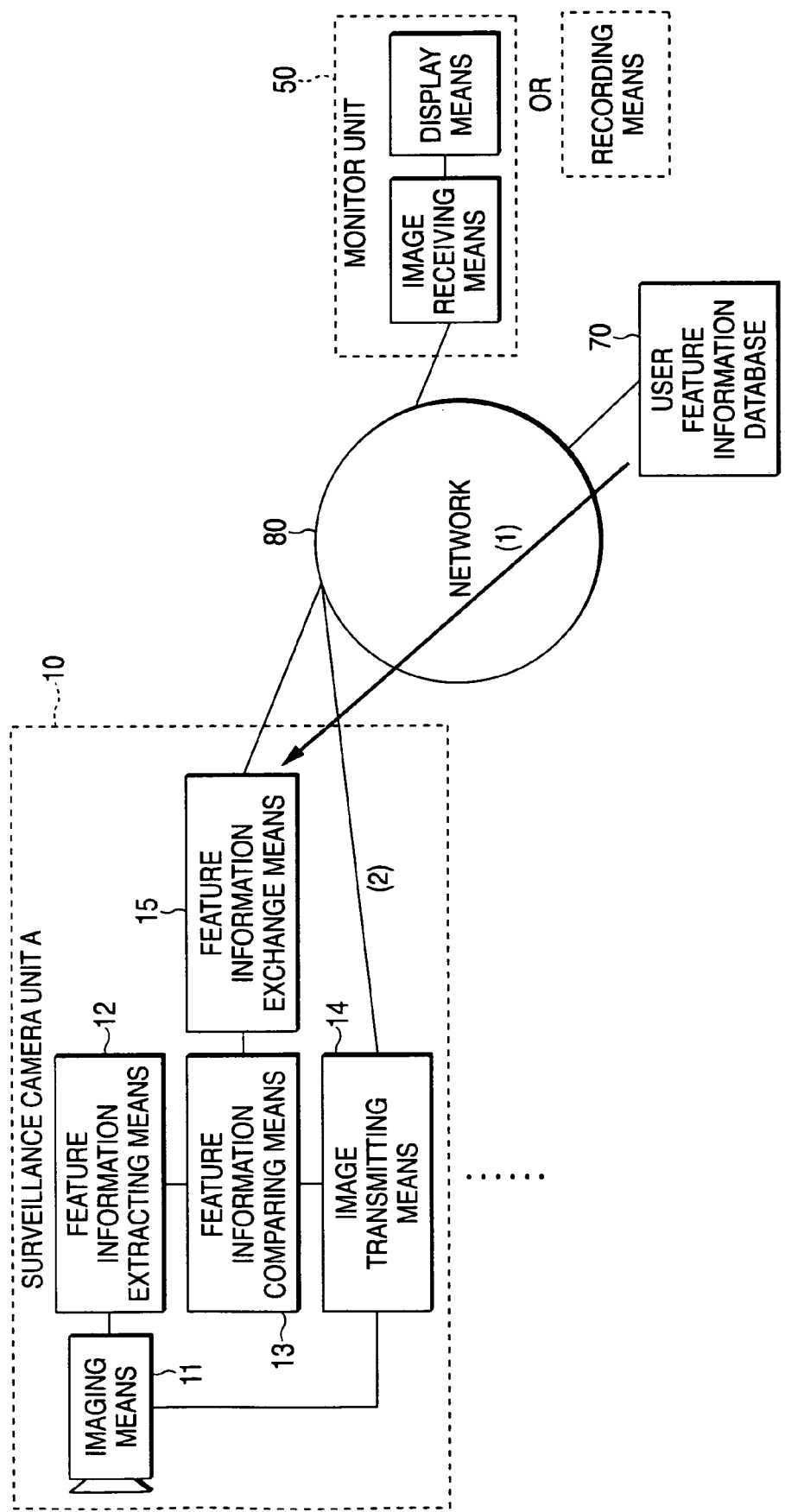
FIG. 11 is a block diagram showing a configuration of a surveillance system according to the third embodiment of the invention.

As shown in FIG. 11, this surveillance system has a user feature information database 70 where the feature information on registered users is stored. The remaining configuration is the same as that of the first embodiment (FIG. 1).

In the user feature information database 70, registered user list that describes information for uniquely enabling to identify a user, such as face image, information on position and shape of eyes, nose, mouth and so on regarding features of face, or iris information, is registered as the feature information of a user.

The feature information extracting means 12 of the surveillance camera unit 10 extracts the feature information from an image picked up by the imaging means 11. When feature information is input from the feature information extracting means 12, the feature information comparing means 13 acquires a registered user list from the user feature information database 70 via the feature information exchange means 15 (procedure (1) in FIG. 11) and determines whether the feature information input from the feature information extracting means 12 is described on the registered user list. Only in the case that the feature information is not described in the registered user list, the feature information comparing means 13 records the feature information into the memory 130 as tracking target information.

The subsequent operation is the same as that of the first embodiment. The surveillance camera unit A that captures a tracking target on the screen keeps transmitting the image to the monitor unit 50 until the tracking target goes out of the shooting range. Once the tracking target goes out of the shooting range, the surveillance camera unit A transmits the tracking target information to the other surveillance camera units and halts transmission of the image to the monitor unit 50.

The other surveillance camera unit 10 retains the feature information received from the surveillance camera unit A in the memory 130. When capturing a tracking target on the screen, the surveillance camera unit 10 transmits the image to the monitor unit 50.

In this way, only a suspicious person not enrolled in the list is tracked and only the image of the suspicious person from the surveillance camera unit 10 is transmitted to the monitor unit 50 for display or recording.

Conversely, only a person enrolled in a registered user list (so-called black list) may be tracked and only the image of the person from the surveillance camera unit 10 may be transmitted to the monitor unit 50 for display or recording.

The techniques of iris authentication are described for example in the following literature:

Nihon jido-ninshiki system kyokai, Youichi Seto et al., "Koredewakatta Biometrics", OHM Co.

(Fourth Embodiment)

The fourth embodiment is a surveillance system where a plurality of surveillance camera units having different authentication functions cooperatively track a target.

Figure 12:
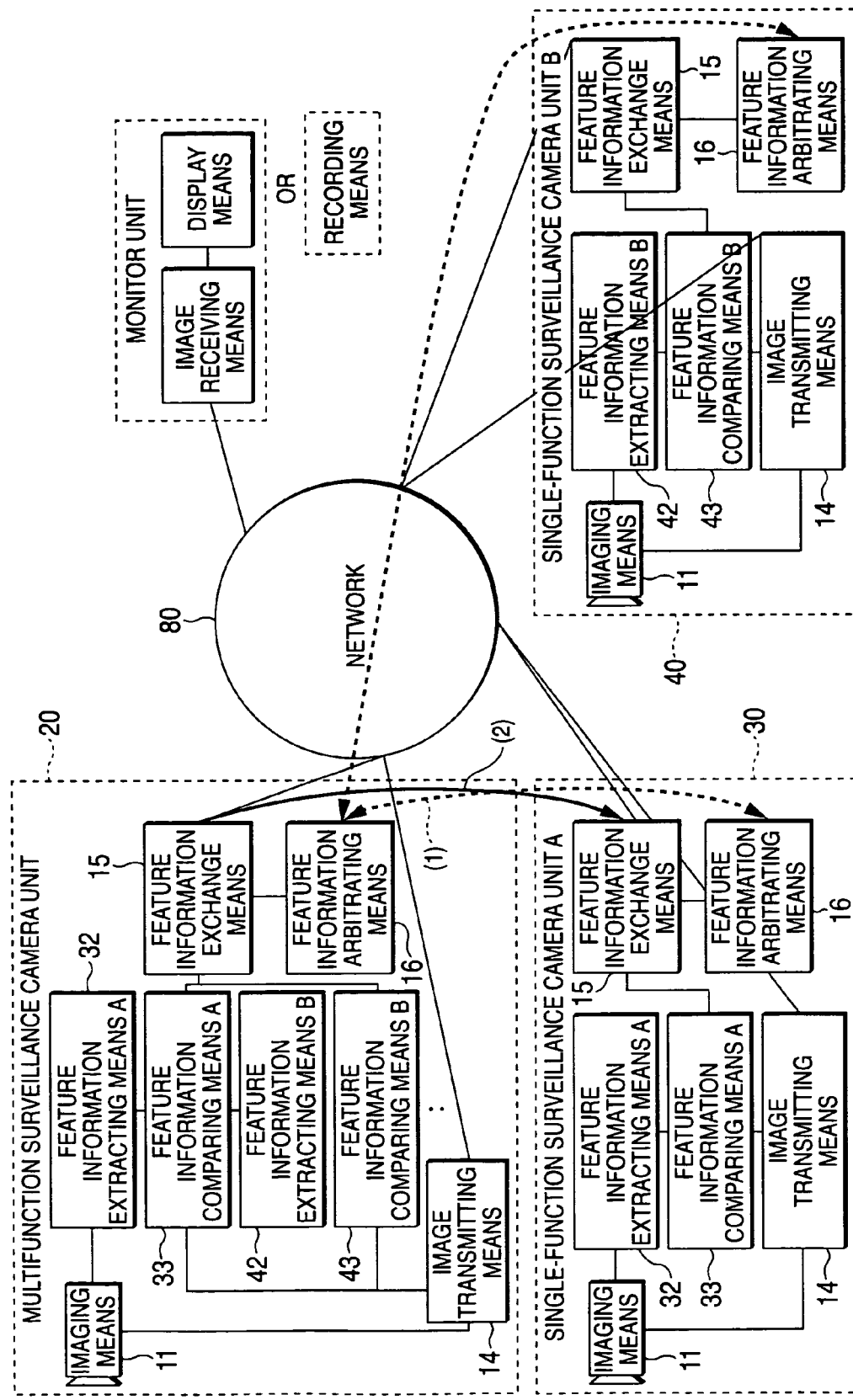
FIG. 12 is a block diagram showing a configuration of a surveillance system according to the fourth embodiment of the invention.
Figure 13:
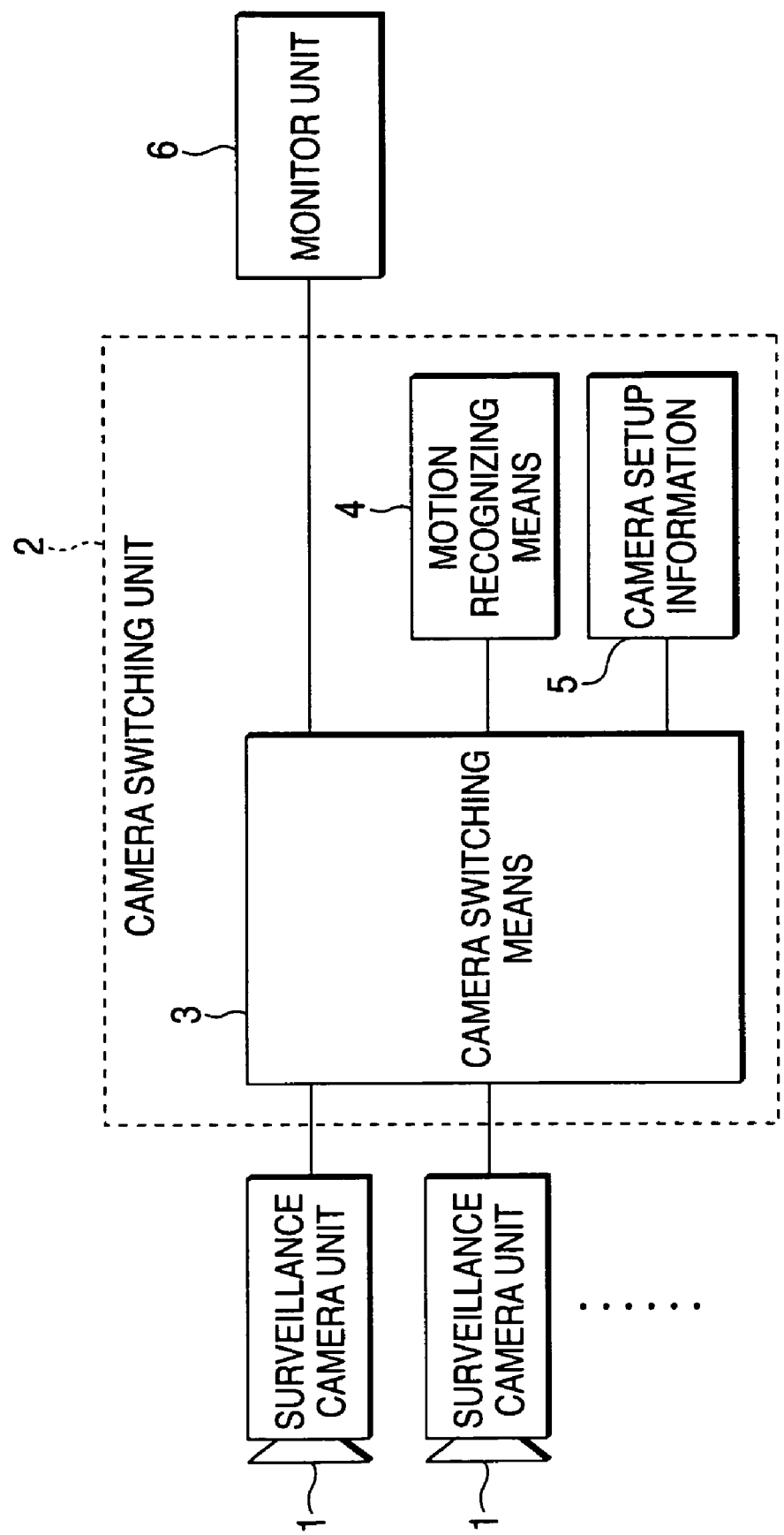
FIG. 13 is a block diagram showing a configuration of a related art surveillance system.

As shown in FIG. 12, in this system, a multifunction surveillance camera unit 20 equipped with a plurality of authentication functions is interconnected with single-function surveillance camera units 30, 40 equipped with a single authentication function via a network 80.

The multifunction surveillance camera unit 20 has, on top of the imaging means 11, the image transmitting means 14 and the feature information exchange means 15, a feature information negotiating means 16 for exchanging recognition capabilities in exchanging feature information with the other surveillance camera unit and further has, for example, feature information extracting means 32 and feature information comparing means 33 having a recognition capability concerning the face of a tracking target and feature information extracting means 42 and feature information comparing means 43 having a recognition capability concerning the entire shape of the tracking target as feature information extracting means and feature information comparing means.

The single-function surveillance camera unit 30 has the imaging means 11, the image transmitting means 14, the feature information exchange means 15 and the feature information negotiating means 16, as well as the feature information extracting means 32 and the feature information comparing means 33 having a recognition capability concerning the face of the tracking target.

The single-function surveillance camera unit 40 has the imaging means 11, the image transmitting means 14, the feature information exchange means 15 and the feature information negotiating means 16, as well as feature the information extracting means 42 and the feature information comparing means 43 having a recognition capability concerning the entire shape of the tracking target.

Operation of the surveillance system will be described.

The multifunction surveillance camera unit 20 first uses the feature information negotiating means 16 to perform "capability exchange" for exchanging information on the recognition capability (procedure (1) in FIG. 12) in transmitting feature information to the single-function surveillance camera units 30, 40 with use of the feature information exchange means 15.

Capability exchange is a function implemented in a multimedia information communications protocol such as H.323 and SIP (Session Initiation Protocol). In the capability exchange procedure, communication parties exchange information which it can handle at the beginning of communications in order to determine a communication mode common to both parties.

For example, the multifunction surveillance camera unit 20 transmits a communications start request and a feature information form (face recognition, object recognition) listing the feature information the multifunction surveillance camera unit 20 can transmit by itself to the single-function surveillance camera units 30, 40 at the beginning of communications.

The single-function surveillance camera unit 30 selects the information available thereto from among the listed information and returns a communication request acceptance and a feature information form (face recognition) to the multifunction surveillance camera unit 20.

In response to this, the multifunction surveillance camera unit 20 transmits the feature information of the face recognition extracted by the feature information extracting means 32 to the single-function surveillance camera unit 30 (procedure (2) in FIG. 12).

The single-function surveillance camera unit 40 selects the information available thereto from among the listed information and returns a communication request acceptance and a feature information form (object recognition) to the multifunction surveillance camera unit 20.

In response to this, the multifunction surveillance camera unit 20 transmits the feature information of the object recognition extracted by the feature information extracting means 42 to the single-function surveillance camera unit 40.

In this way, according to this surveillance system, a plurality of surveillance camera units having different authentication functions can cooperatively track a target while exchanging feature information handled in common.

This surveillance system may be applied to the following arrangement in an application of surveillance of a facility or a specific region so as to perform efficient surveillance.

At an entrance of a facility or a region is arranged a multifunction surveillance camera unit which can acquire face feature information (high-accuracy feature information on a specific area such as face authentication) and overall feature information (low-accuracy but widely applicable feature information such as shape of a body and color information). In other places, single-function surveillance camera units which can acquire overall feature information alone are arranged. The face feature information on the members and local community residents who are permitted to use the facility is registered in the list described in the third embodiment.

The multifunction surveillance camera unit arranged at the entrance acquires the face feature information on a person passing through the entrance and compares the face feature information with the face feature information in the registered user list. Recognizing a suspicious person not enrolled in the registered user list, the multifunction surveillance camera unit transmits the image of the suspicious person to a monitor unit as well as transmits the overall feature information on the suspicious person to each single-function surveillance camera unit. Single-function surveillance camera unit, which captured the overall feature information on the suspicious person in the image picked up, transmits the image of the suspicious person to the monitor unit.

In this way, advanced surveillance is attained by arranging, at several locations, surveillance cameras having functions appropriate for the locations and allowing the surveillance cameras to work cooperatively. Use of one multifunction camera and single-function cameras reduces the total costs.

Also, an application is possible where one multifunction camera is arranged in a passage and a hall frequented by people and single-function cameras at locations and in rooms less frequently visited by people.

As understood from the foregoing description, according to the surveillance system of the invention, a plurality of intelligent surveillance camera units cooperatively and autonomously track a target and transmit its image to a monitor unit. Therefore, a surveyor can readily track and monitor a suspicious person with special operation.

According to this surveillance system, even when a suspicious person has entered a blind spot of a surveillance camera, tracking of the suspicious person is automatically resumed when a surveillance camera has captured the target in an image. This makes it possible to keep tracking of same target even in a space including more blind spots. It is also possible to reduce the number of surveillance cameras installed.

What is claimed is:

1. An apparatus for filling a receptacle, the apparatus comprising:
   a reservoir adapted to contain a supply of powder pharmaceutical formulation;
   a holder adapted to hold a receptacle in a position where it may receive powder from the reservoir,
   an extension extending above the receptacle, and a plunger moveable within the extension, whereby powder from the supply may fill the receptacle and at least a portion of the extension and the plunger may force the powder in the extension into the receptacle.

2. An apparatus according to claim 1 wherein the plunger comprises a piston.

3. An apparatus according to claim 1 wherein the plunger comprises a portion of the receptacle.

4. An apparatus according to claim 1 wherein the holder is adapted to hold a bottom portion of a capsule.

5. An apparatus according to claim 4 wherein the plunger comprises a top portion of the capsule.

6. An apparatus according to claim 4 wherein the plunger comprises a member adapted to advance a top portion of the capsule.

7. An apparatus according to claim 1 wherein the holder is adapted to hold a cavity containing layer of a multi-layered package.

8. An apparatus according to claim 1 wherein the holder and the extension are integrally formed.

9. An apparatus according to claim 1 further comprising a powder fluidizer to cause powder to flow from the reservoir to the receptacle.

10. An apparatus for filling a receptacle, the apparatus comprising:

a reservoir adapted to contain a supply of powder pharmaceutical formulation;

a holder adapted to hold a receptacle in a position where it may receive powder from the reservoir, an extension extending above the receptacle, and a powder compactor, whereby powder from the supply may fill the receptacle and at least a portion of the extension and whereby the powder compactor may compact the powder so that the powder in the portion of the extension may be received in the receptacle.

11. An apparatus according to claim 10 wherein the compactor comprises a piston.

12. An apparatus according to claim 10 wherein the compactor comprises a portion of the receptacle.

13. An apparatus according to claim 10 wherein the compactor comprises a vibrating member.

14. An apparatus according to claim 10 wherein the compactor comprises a vibrating membrane adapted to compact by the powder by acoustic energy.

15. An apparatus according to claim 10 wherein the holder is adapted to hold a bottom portion of a capsule.

16. An apparatus according to claim 15 wherein the compactor comprises a top portion of the capsule.

17. An apparatus according to claim 15 wherein the compactor comprises a member adapted to advance a top portion of the capsule.

* * * * *

UNITED STATES PATENT AND TRADEMARK OFFICE
CERTIFICATE OF CORRECTION

PATENT NO.       : 7,227,569 B2
APPLICATION NO.  : 10/430492
DATED            : June 5, 2007
INVENTOR(S)      : Kensuke Maruya It is certified that error appears in the above-identified patent and that said Letters Patent is hereby corrected as shown below:

Please delete the section beginning in Column 10 Line 60 and the entire Column 11 as well entire Column 12, and insert therefor:

What is claimed is:

1. A surveillance system in which a plurality of surveillance camera units cooperatively acquire images of a movable object, comprising: a plurality of the surveillance camera units, each having imaging means for picking up images, feature information extracting means for analyzing the images picked up by the imaging means to extract feature information representing features of the movable object, and image transmitting means for transmitting images picked up by the imaging means to a communications unit via a network, wherein the surveillance camera unit which has recognized the feature information on the movable object in the images picked up transmits the images to the communications unit connected via the network, when the surveillance camera unit no longer recognizes the feature information on the movable object, the surveillance camera unit transmits the feature information on the movable object as a tracking target to the other surveillance camera unit, and the other surveillance camera unit which has recognized the feature information on the movable object in the images picked up transmits the images to the communications unit connected via the network.

2. A surveillance system according to claim 1, wherein the communications unit transmits information designating a movable object to be a tracking target from the images transmitted from the surveillance camera unit.

3. A surveillance system according to claim 1, further comprising:
a feature information database in which feature information for enabling to identify a person is registered, wherein the surveillance camera unit which has recognized the feature information on a movable object in the images picked up refers to the feature information registered in the feature information database via the network to determine whether the movable object is to be tracked or not.

4. A surveillance system according to claim 1, wherein the feature information is image data of a movable object extracted from an image excluding a background.

5. A surveillance system according to claim 1, wherein the feature information includes information to identify a movable object by way of shape, color or size of the movable object extracted from an image excluding a background.

6. A surveillance system according to claim 1, wherein the feature information is information representing a human face.

UNITED STATES PATENT AND TRADEMARK OFFICE
CERTIFICATE OF CORRECTION

| | |
|---|---|
| PATENT NO. | : 7,227,569 B2 |
| APPLICATION NO. | : 10/430492 |
| DATED | : June 5, 2007 |
| INVENTOR(S) | : Kensuke Maruya |

It is certified that error appears in the above-identified patent and that said Letters Patent is hereby corrected as shown below:

7. A surveillance system according to claim 1, wherein the surveillance camera unit transmits information concerning type of feature information which the feature information extracting means can extract to the other surveillance camera unit, and determines feature information to be transmitted after receiving the information concerning type of feature information which can be extracted from the other surveillance camera unit.

8. A surveillance camera apparatus for acquiring images of a movable object to be tracked, comprising: imaging means for picking up images and outputting digital image data, feature information extracting means or analyzing the digital image data by using image recognition techniques to extract feature information representing features of the movable object, feature information comparing means for comparing the feature information extracted by the feature information extracting means with a feature information on the movable object to be tracked to determine whether both pieces of feature information are identical or not, feature information exchange means for exchanging the feature information on the movable object to be tracked with the other surveillance camera apparatus via a network, and image transmitting means for transmitting images picked up by the imaging means to communications unit via the network when the feature information comparing means has determined that both pieces of feature information are identical.

9. A surveillance camera apparatus according to claim 8, wherein the feature information extracting means extracts image data of a movable object from the digital image data excluding background information.

10. A surveillance camera apparatus according to claim 8, wherein the feature information extracting means extracts image data of a movable object from the digital image data excluding background information and generates information to identify the movable object by way of shape, color or size of the movable object.

11. A surveillance camera apparatus according to claim 10, wherein the feature information extracting means extracts information representing features of a human face from the digital image data.

12. A surveillance camera apparatus according to claim 8, wherein the feature information extracting means extracts information on iris from the digital image data.

UNITED STATES PATENT AND TRADEMARK OFFICE
CERTIFICATE OF CORRECTION

PATENT NO. : 7,227,569 B2
APPLICATION NO. : 10/430492
DATED : June 5, 2007
INVENTOR(S) : Kensuke Maruya It is certified that error appears in the above-identified patent and that said Letters Patent is hereby corrected as shown below:

13. A surveillance camera apparatus according to claim 8, wherein the feature information exchange means receives the feature information on the movable object to be tracked from the communications unit, and the feature information comparing means compares the feature information extracted by the feature information extracting means with the feature information received by the feature information exchange means from the communications unit to determine whether both pieces of feature information are identical or not.

14. A surveillance camera apparatus according to claim 8, wherein the feature information comparing means refers to a feature information database in which feature information for enabling to identify a person is registered, and excludes feature information registered in the feature information database from a target of determination.

15. A surveillance camera apparatus according to claim 8, further comprising: another feature information extracting means for analyzing the digital image data by using another image recognition techniques to extract another type of feature information representing features of the movable object, another feature information comparing means for comparing the feature information extracted by the another feature information extracting means with a feature information on the movable object to be tracked to determine whether both pieces of feature information are identical or not.

16. A surveillance camera apparatus according to claim 8, further comprising: feature information negotiating means for transmitting information concerning type of feature information which the feature information extracting means can extract to the other surveillance camera apparatus, and determining feature information to be transmitted after receiving the information concerning type of feature information which can be extracted front the other surveillance camera unit.

UNITED STATES PATENT AND TRADEMARK OFFICE
CERTIFICATE OF CORRECTION

PATENT NO.        : 7,227,569 B2
APPLICATION NO.   : 10/430492
DATED             : June 5, 2007
INVENTOR(S)       : Kensuke Maruya It is certified that error appears in the above-identified patent and that said Letters Patent is hereby corrected as shown below:

17. A surveillance camera apparatus according to claim 15, further comprising: feature information negotiating means for transmitting information concerning type of feature information which the feature information extracting means can extract to the other surveillance camera apparatus, and determining feature information to be transmitted after receiving the information concerning type of feature information which can be extracted from the other surveillance camera unit.

Signed and Sealed this

Twenty-seventh Day of November, 2007

JON W. DUDAS
*Director of the United States Patent and Trademark Office*